US 9,214,023 B2

(12) United States Patent
Berlinger et al.

(10) Patent No.: US 9,214,023 B2
(45) Date of Patent: Dec. 15, 2015

(54) DETERMINATION OF REGIONS OF AN ANALYTICAL IMAGE THAT ARE SUBJECT TO VITAL MOVEMENT

(75) Inventors: Kajetan Berlinger, München (DE); Armin Fürst, Erlangen (DE)

(73) Assignee: Brainlab AG, Feldkirchen (DE)

( * ) Notice: Subject to any disclaimer, the term of this patent is extended or adjusted under 35 U.S.C. 154(b) by 518 days.

(21) Appl. No.: 12/621,881

(22) Filed: Nov. 19, 2009

(65) Prior Publication Data

US 2010/0125195 A1    May 20, 2010

Related U.S. Application Data

(60) Provisional application No. 61/150,148, filed on Feb. 5, 2009.

(51) Int. Cl.
   *A61B 5/05* (2006.01)
   *G06T 7/00* (2006.01)
   *G06T 7/20* (2006.01)

(52) U.S. Cl.
   CPC ............... *G06T 7/0044* (2013.01); *G06T 7/204* (2013.01); *G06T 2207/10076* (2013.01); *G06T 2207/10081* (2013.01); *G06T 2207/10116* (2013.01); *G06T 2207/30061* (2013.01); *G06T 2207/30064* (2013.01); *G06T 2207/30096* (2013.01); *G06T 2207/30241* (2013.01)

(58) Field of Classification Search
   CPC .................................................... G06T 7/0044
   USPC ......... 600/407, 411, 414, 424, 425, 426, 427; 378/62, 63, 64, 65
   See application file for complete search history.

(56) References Cited

U.S. PATENT DOCUMENTS

| 5,889,834 | A | 3/1999 | Vilsmeier et al. |
| 7,386,099 | B1 | 6/2008 | Kasper et al. |
| 2003/0120145 | A1* | 6/2003 | Schmitz et al. ............... 600/407 |

(Continued)

FOREIGN PATENT DOCUMENTS

| EP | 07 002 992 | 3/1996 |
| EP | 07 002 993 | 3/1996 |

(Continued)

OTHER PUBLICATIONS

Deformable Models in Medical Image Analysis: A Survey, McInerney, T., Medical Image Analysis, 1 (2): 91-108 (1196).*

(Continued)

*Primary Examiner* — Rajeev Siripurapu
(74) *Attorney, Agent, or Firm* — Tucker Ellis, LLP

(57) ABSTRACT

The present invention relates to a determination method that enables the position of a body part subject to vital movement to be determined, wherein the body part is to be irradiated. A region of an analytical image is determined, wherein the region represents a body part subject to vital movement, in particular a tumor in an anatomical body. A change in position from one analytical image to the next is performed that reflects the vital movement, wherein the body parts subject to vital movement are parts of the body that are to be irradiated or are not to be irradiated and that move as a result of vital functions such as respiration and/or heartbeat even when the anatomical body is otherwise kept deliberately at rest.

16 Claims, 6 Drawing Sheets

(56) References Cited

U.S. PATENT DOCUMENTS

2004/0092815 A1* 5/2004 Schweikard et al. ......... 600/425
2008/0039713 A1* 2/2008 Thomson et al. ............. 600/411

FOREIGN PATENT DOCUMENTS

EP   1 880 673    1/2008
EP   2 119 397    11/2009

OTHER PUBLICATIONS

Roger Y. Tsai; "An Efficient and Accurate Camera Calibration Technique for 3D Machine Vision," Proceedings of IEEE Conference on Computer Vision and Pattern Recognition; 1986; pp. 364-374.

Roger Y. Tsai; "A Versatile Camera Calibration Technique for High-Accuracy 3D Machine Vision Metrology Using Off-the-Shelf TV Cameras and Lenses," IEEE Journal of Robotics and Automation; Aug. 1987; pp. 323-344.

Ziz Yaniv et al.; "Fluoroscopic X-ray Image Processing and Registration for Computer-Aided Orthopaedic Surgery."

Ross et al., "Real-Time Liver Motion Compensation for MrgFUS", Medical Image Computing and Computer-Assisted Intervention a MICCAI, Sep. 2008, pp. 806-813.

Schweikard et al., "Fiducial-Less Respiration Tracking in Radiosurgery", Lecture Notes in Computer Science, vol. 3217, Jan. 1, 2004, pp. 992-999.

Vences et al., "Target Motion Measurement Without Implanted Markers and its Validation by Comparison with Manually Obtained Data", Medical Physics [Online], Oct. 2005, pp. 3431-3439.

Voirin et al., "Computer-aided hepatic tumour ablation: requirements and preliminary results", Comptes Rendus-Biologies, Apr. 2002, pp. 309-319.

European Search Report for corresponding application No. 08169422.6 dated Jun. 5, 2009.

U.S. Appl. No. 12/029,716, filed Feb. 2008, Dohmen et al.

U.S. Appl. No. 12/030,228, filed Feb. 2008, Fleig et al.

McInerney et al., "Deformable Models in Medical Image Analysis: A Survey", Oxford University Press; Medical Image Analysis (1996), vol. 1, No. 2, pp. 91-108.

Senneville et al., "Real-Time Adaptive Methods for Treatment of Mobile Organs by MRI-Controlled High-Intensity Focused Ultrasound", Magnetic Resonance in Medicine, (2007) 57, pp. 319-330.

* cited by examiner a)          b)

DETERMINATION OF REGIONS OF AN ANALYTICAL IMAGE THAT ARE SUBJECT TO VITAL MOVEMENT

RELATED APPLICATION DATA

This application claims priority of U.S. Provisional Application No. 61/150,148 filed on Feb. 5, 2009, which is incorporated herein by reference in its entirety.

FIELD OF THE INVENTION

The present invention relates to the determination of regions of an analytical image that are subject to vital movement.

PRIOR ART

Reference is made to the publication "Real-Time Liver Motion Compensation for MRgFUS", by James C. Ross, Rekha Tranquebar, and Dattesh Shanbhag, published at MICCAI 2008 in New York:
MICCAI 2008, Part II, LNCS 5242, pp. 806-813, 2008 (publishers of proceedings: D. Metaxas et al., Springer-Verlag, Berlin Heidelberg 2008).

SUMMARY OF THE INVENTION

The independent claims describe the subject matter of the invention. The dependent claims relate to advantageous embodiments.

Advantageously, the subject matter of the invention makes it possible to determine a position of a body part subject to vital movement that is to be irradiated.

Herein, the position of a body part subject to vital movement is either described by the (two-dimensional) position of a region in an analytical image, or it is determined by a (three-dimensional) position in a reference system (e.g. a reference system of the treatment space) on the basis of the position of the region in the analytical image. In general, the term "position" herein has a two-dimensional significance and relates to an analytical image, and has a three-dimensional significance and relates to a reference system. The region represents a body part subject to vital movement. Advantageously, the determined position makes it possible to take account of a change in position, caused by the vital movement, of the body parts subject to vital movement, through control of a treatment beam. In this application, the analytical image is described as two-dimensional by way of example. It is also intended to include a three-dimensional analytical image, however. In this case the region would have a three-dimensional position.

Regions of an analytical image that are subject to vital movement are regions representing a part of an anatomical body that is subject to vital movement. The term "subject to vital movement" means that the body parts are moved by vital functions of the body such as respiration and/or heartbeat. These functions of the body sustain life. The thereby generated movements of parts of the body such as ribs or soft tissue may be disruptive during the irradiation of body parts such as a tumor. The deliberate suppression of respiration, which represents a considerable part of vital movement, is only possible for a limited time. It would thus be desirable to have information available that enables conclusions to be drawn about the vital movement of the tumor in order to plot a treatment beam such that the latter hits the tumor throughout the entire irradiation procedure.

As the inventors have realized, it is possible to generate information of this kind if one or more regions that represent body parts that are subject to vital movement are determined in analytical images. Once the region has been determined, the position of the region in the analytical region, which changes from one analytical image to the next and thus reflects the vital movement, is also determined. Analytical images are images that are generated by medical analytical methods such as X-ray diagnostics, magnetic resonance analysis, ultrasound analysis, etc. The use of the term "X-ray image" below instead of "analytical image" is made purely by way of example.

Treatment beams are for example X rays or particle rays or ultrasound that are used in particular to destroy malignant tissue.

As a result of the determination method according to the invention, preferably X-ray images of an anatomical body are processed to represent the body parts of the anatomical body that are subject to vital movement, in particular a tumor. As will be explained below, it is possible to utilize the fact that body parts subject to vital movement other than the tumor, which may possibly be easier to detect than the tumor, are also represented. Here, body parts are any regions of the body, which do not need to be clearly delimited and need not have a particular function. In particular, they may include portions of a plurality of body parts and transitional regions between two body parts that are particularly easy to detect in the analytical image, such as a portion of the edge of the diaphragm. Regions of the analytical image that represent a body part subject to vital movement are designated advance regions if they were obtained before the (automatic) determination procedure and form the basis for the (automatic) determination procedure. Regions that are determined (automatically) by the determination method (determination procedure) according to the invention are designated procedure regions. The advance analytical images are obtained in particular before a control of the treatment beam that takes account of the vital movements, and are used in particular for the automatic determination of procedure regions, in particular during control of the treatment beam. Where there is mention herein or in the claims of the advance analytical image data including an advance analytical image, this means—in accordance with conventional language usage—that the advance analytical image data may also include a plurality of advance analytical images. Where there is mention of the advance analytical image including an advance region, this means—in accordance with conventional language usage—that the advance X-ray image may also include a plurality of advance regions. When there is mention herein or in the claims of the procedure analytical image data including the description of a procedure analytical image, this means that it may also include the description of a plurality of procedure analytical images. Where there is mention herein or in the claims of a procedure region being determined, then—in accordance with conventional language usage—this does not exclude the possibility that a plurality of procedure regions are determined. The provided advance analytical image data thus includes the description of at least one advance analytical image that includes at least one advance region.

Accordingly, the procedure analytical image data includes at least the description of a procedure analytical image that includes at least one procedure region. The procedure regions are part of the analytical images that are obtained after the advance analytical images, and are fed to the determination method according to the invention and described by procedure analytical image data. These analytical images are designated procedure analytical images herein. A procedure analytical image that is currently being obtained represents the current position of body parts of the anatomical body that are subject to vital movement. When a procedure region is determined in the procedure analytical image, then consequently the position of the procedure region, which is designated a "procedure position" here, is also determined in the procedure analytical image. The procedure position may for example be described by specifying the pixels forming the procedure region, or for example by specifying where in the X-ray image the pixels that form the corners of the procedure region are located. The procedure position of a procedure region may change from one procedure analytical image to the next, since the procedure region represents a body part subject to vital movement. These procedure positions, which result from the determination method according to the invention, are preferably output (automatically) by the determination method and may be used for (automatic) control of a treatment beam. To use the determined procedure positions, a relationship between the (two-dimensional) procedure position in the procedure analytical image and a (three-dimensional) position of the portion in space in which the treatment beam is to act may previously be stored or determined. This relationship may be determined for example by way of a rearward extrapolation with a known camera geometry of an X-ray machine, which represents an example of an analysis device. Preferably, for this purpose, at least two X-ray cameras are used and the principles of epipolar geometry are used. For example, it is also possible to generate analytical images from a calibration model, for example X-ray images from a calibration model that is visible in the X-ray image and which is placed in the region in which a patient is subsequently to lie, in place of the patient. By evaluating the analytical images from the calibration model, it is possible to determine which coordinates in the X-ray image correspond to which three-dimensional coordinates (in a reference system, e.g. in the treatment space). For this purpose, marker devices that are attached to the calibration model may also be used in order to be able to determine the position of individual parts of the calibration model in the reference system (e.g. in the treatment space) by detecting the marker device. Preferably, these parts of the calibration model have a specific shape so that they are detectable in the analytical image.

The provided procedure analytical image data thus preferably describes a procedure analytical image of the present, and is preferably updated after a predetermined period (e.g.>10 ms and/or less than 1 minute) such that the procedure analytical image data that is provided over time describes a sequence of procedure analytical images, for example a plurality of procedure analytical images each minute, in particular each vital movement cycle (e.g. respiratory cycle). The vital movements considered herein are in particular cyclic, and so they perform the same or a similar path of movement repeatedly. In particular, the period of a vital movement that is considered herein is less than one minute. Preferably, the procedure region is determined in the current procedure analytical image in order to determine, and in particular to output, a current procedure position. One procedure region or a plurality of procedure regions may be determined in the procedure analytical image. The procedure region is determined such that it corresponds to the advance region, with at least one advance region similarly being created but it also being possible for a plurality to be created. Thus, an advance region is associated with each of the procedure regions. The procedure region is determined on the basis of the (associated) advance region such that it corresponds (as far as possible exactly) to the latter. Here, image recognition methods such as pattern recognition methods may be used. In particular, the size and/or shape of the advance region is the same as the size and/or shape of the procedure region. In particular, by means of the image recognition method, a search is performed in the procedure analytical image for a region which is as similar as possible to the advance region or to one of the (selected) advance regions. Preferably, the one displaying the greatest similarity is then selected. A measure of the similarity may for example be the sum of the amounts or the squares of the difference between the pixel values of a difference pattern, where the difference pattern is formed from a candidate for a procedure region and the advance region. It is also possible to determine a correlation coefficient that describes the correlation between the advance region and the procedure region as a measure of the similarity. In particular, a procedure region "corresponds" to an advance region if it has at least a predetermined extent of similarity, provided the extent of similarity of the procedure region displays the maximum similarity when compared with other regions. Where amounts or squares are determined, maximum similarity prevails if for example the amounts or squares are at a minimum. Where correlation coefficients are determined, maximum similarity prevails for example if they are at a maximum. According to a further embodiment, regions in which the extent of similarity exceeds a threshold value and is thus sufficient represent candidates for a procedure region. It is then possible to select a procedure region from the candidates, in accordance with further criteria.

According to an embodiment, a search frame having the size of the advance region is established. The search frame is then laid for example on the procedure image to scan the latter, or is laid for example only on the determination region to scan only the latter. The image inside the search frame is compared with the advance region. If the extent of similarity is sufficient, the procedure region has been found. During the search procedure, preferably the search frame is displaced pixel by pixel in steps, and the extent of similarity is determined at each step and compared with a predetermined threshold value. The search procedure is preferably continued until the entire procedure image or the entire determination region has been scanned with the search frame. It goes without saying that the search method can also be optimized to make it faster such that in a favorable case the search is not performed pixel by pixel but in a more targeted way.

The procedure region and hence the procedure position (of the procedure region) in the procedure analytical image is preferably determined with the aid of movement data, as will be explained below. According to a variant on the invention, the determined procedure position that was determined with or without the aid of movement data may be used to determine the position of a second body part subject to vital movement. Here, use is made of the fact that some body parts subject to vital movement are more easily (automatically) detectable in the analytical image (advance analytical image or procedure analytical image) than others, in particular as a body part subject to vital movement that is to be irradiated. Where there is mention in general herein of the "position of a body part subject to vital movement", this is to include both the position of the image of the body part subject to vital movement in the analytical image (advance analytical image and/or procedure analytical image) and also the position of the body part subject to vital movement in three-dimensional space, for example in the space of a reference system, for example a reference system of a navigation system or the treatment space. Information for controlling a treatment beam may be collected both from the position in the analytical image and from the position in three-dimensional space.

As mentioned above, the already determined procedure position of a first body part subject to vital movement (in the procedure image) may be used to determine the position of a second body part subject to vital movement. For this purpose, preferably relative position data is used. This relative position data may for example be provided. In particular, it is determined from a three-dimensional, preferably four-dimensional, analytical method that generates three-dimensional, preferably four-dimensional, body data. The fourth dimension here relates to time. For example, with a four-dimensional CT the relative position of a first body part subject to vital movement in relation to a second body part subject to vital movement may be determined advance, that is to say before the irradiation procedure. Reference is made in this regard to the following patent application: U.S. patent application Ser. No. 60/982,761. A copy of this application is attached.

As described therein, the relative position is determined taking into account the vital movements. In particular, the relative position data thus includes "situation-dependent" relative positions of the first to the second body part. Here, the term "situation-dependent" is intended to mean that the relative position is dependent on the situation of the vital function (respiratory situation, that is to say for example the degree of inhalation or exhalation). In particular, the relative position data may also be dependent on heartbeat, that is to say for example on the situation at the beginning, middle or end of a heartbeat cycle. Thus, the "situation" relates in particular to the different amplitudes prevailing during the cyclic procedures of the vital functions (respiration and/or heartbeat). The relative position data may therefore be static and/or "situation-dependent", that is to say dynamic, relative position data. This relative position data is then preferably used to determine from the determined procedure position of the first body part subject to vital movement the (two- or three-dimensional) position of the second body part subject to vital movement. Since in the present case the relative position data describes three-dimensional position conditions, when the position of the second body part subject to vital movement is determined the procedure may for example be as follows. A three-dimensional position is calculated from the procedure position of the first body part subject to vital movement. For this, use may be made of information on the imaging geometry (imaging geometry data) that prevails during generation of the analytical images. In particular, the principles of epipolar geometry, rearward extrapolation and/or a calibration model may be used. The relationship between two-dimensional X-ray image data from a calibration model and three-dimensional calibration data of a calibration model may be used to associate regions in the X-ray image with regions in the 3D CT image. For this purpose, reference is made for example to the application EP 08 156 293.6 (corresponding to U.S. patent application Ser. No. 61/054,187) from the same applicant. There, use of the imaging geometry for determining the relationship and in particular the pinhole camera principle is explained with further cited references. The principle of epipolar geometry, which establishes a relationship between a 2D X-ray image and 3D points, is explained in the following applications from the same applicant, with further cited references:

EP 07 002 992.1 and
EP 07 002 993.9, or
U.S. Ser. No. 12/029,716 and
U.S. Ser. No. 12/030,228.

The applications cited herein are disclosed herein by reference.

Thus, once a three-dimensional position has been calculated from the procedure position of the first body part subject to vital movement, then the position of the second body part subject to vital movement may be determined for example by simple vector calculation, by referring to the relative position data. This determination may be combined with the movement data if the relative position data is "situation-dependent". The relative position data is thus dependent on the vital parameters that are mentioned below (such as amplitude of respiration or heart rate). The relative position can thus be calculated for a vital parameter prevailing in the present situation. The relative position that is calculated in this way is then used to determine the position between the first and the second body part subject to vital movement.

Preferably, it is communicated to the determination method according to the invention, e.g. by user input, which region the advance region that represents the first body part subject to vital movement in a model of the body represented by the three-dimensional or four-dimensional body data correspond to. Once this region has been identified, the relative position in respect of the second body part subject to vital movement can be determined from the three-dimensional or four-dimensional body data. The advantage herein lies in particular in the fact that this three-dimensional and preferably four-dimensional body data is at a higher and in particular a spatial resolution and hence makes it easier to identify a body part that is to be irradiated, in particular a tumor. As an alternative, it is also possible to proceed such that advance, in a three-dimensional model, a region is established as a first body part subject to vital movement, for which the starting point is that it is easily detected in the analytical image. This first body part subject to vital movement is then preferably detected in the analytical image by an operative who then establishes the advance region showing the first body part subject to vital movement. The thus established advance region then serves as the starting point for the method according to the invention. Furthermore, the relative position data of the first body part subject to vital movement in relation to the second body part subject to vital movement is known from the three-dimensional or four-dimensional body data.

According to a further variant, the position of an advance region in the analytical image, which represents the second body part subject to vital movement (whether or not this is detectable to the observer), may be calculated on the basis of the preferably known information on the imaging geometry of the analysis device that is used when the analytical image data is generated. In this way, the operative can follow the relative position of the first body part subject to vital movement in relation to the second body part subject to vital movement on screen.

The relative position data may be provided or determined in dependence on vital parameters (see above). However, it is also possible for the relative position data to be provided (as an alternative or in addition) in dependence on the procedure position (of the first body part subject to vital movement). In particular, it is possible to establish a correlation between the (absolute) position of the first body part subject to vital movement and the relative position of the first body part subject to vital movement in relation to the second body part subject to vital movement on the basis of the four-dimensional relative position data, which thus shows different relative positions for different situations. The three-dimensional position of the first body part subject to vital movement can be related to the procedure position by means of the imaging geometry data, e.g. by way of the above-mentioned methods (rearward extrapolation, epipolar geometry) and/or by means of a calibration model. From this it is possible to determine which procedure position of the first body part subject to vital movement corresponds to which three-dimensional position of the first body part subject to vital movement in the relative position data. In this way, relative position data can be provided such that it describes a determined relative position of the first body part subject to vital movement in relation to the second body part subject to vital movement for a determined procedure position. The thus modified relative position data may be provided for the method according to the invention and thus used as the basis for a "situation-dependent" determination (in this case, therefore, a determination in dependence on the procedure position) of the relative position and thus the position of the second body part subject to vital movement.

As described above, the relative position data may be determined advance by analytical methods (such as four-dimensional CT) and provided for the determination method according to the invention. It is also possible to derive the relative position data from the determination of two advance regions, wherein for example a first advance region corresponds to the above-mentioned advance region that represents the first body part subject to vital movement, and a second advance region represents the second body part subject to vital movement, as explained below. Here too, the relative position data may be determined in a manner "dependent on situation", that is to say in dependence on at least one vital parameter. Moreover (in addition or as an alternative), the relative position data may be provided in dependence on the position of the first advance region, which represents the first body part subject to vital movement. Similarly, it is possible to calculate from the four-dimensional body data how the relative position data in the procedure analytical image is dependent on the present procedure position. For this purpose, once again the above-mentioned imaging geometry data and/or the calibration model may be used. By way of example, however, a constant relative position is assumed below. This means that the relative position is the same even for different vital parameters.

As was already mentioned above, more than one advance region may be provided and used to determine the change in position. For example, a doctor may determine in an advance analytical image a first advance region that represents an easily detectable body part subject to vital movement, such as a part that includes a portion of the edge of the diaphragm. A region that includes a portion of the edge of the diaphragm conventionally displays relatively high contrast at the edge of the diaphragm in the analytical image. This edge moves with respiration and is thus a body part subject to vital movement. A further, second advance region may for example represent the tumor, which is also subject to vital movement as a result of respiration. On the basis of the first advance region, the first procedure region is determined, which is similar to the first advance region at least to a predetermined extent and represents the same body part subject to vital movement as the first advance region. This is possible with a high degree of reliability because of the ease of detecting the first body part subject to vital movement (in the example of the edge of the diaphragm). Since both advance regions are known, their relative positions are also known, here designated the "advance relative position" and forming an example of the relative position data. On the assumption that the advance relative position is unaffected by vital movement, it is possible to determine the position of the second procedure region (automatically) from the position of the first procedure region and the known advance relative position, without the use of image recognition methods. As an alternative, the anticipated position of the second procedure region that is calculated in this way may be used to restrict a region in which a search is to be performed for the second procedure region using an image recognition method, by restricting the determination region for determining the second procedure region. In this way too, the second procedure region, which in the said example represents the tumor, may be determined with a high degree of reliability. Once the second procedure region has been determined, it is thus also possible to determine its position in the (present) procedure analytical image (automatically), such that the control can be performed on this basis. As an alternative to the above-mentioned advance relative position of the first to the second advance region, the calculation may also be based on a "first relative position" of the first advance region in relation to a first procedure region. In this case, it is preferably assumed that the second relative position of the second advance region in relation to the second procedure region corresponds to the first relative position, that is that the second region has moved (from generation of the advance analytical image to generation of the procedure analytical image) to the same extent. By determining the first procedure region and the first relative position of the first advance region in relation to the first procedure region, it is thus possible to determine information on the movement of the body parts subject to vital movement. The information established in this way forms an example of the movement data mentioned below, on the basis of which a procedure region and in particular the determination region are preferably determined. The determination of at least one of the two above-mentioned relative positions and the determination of the first procedure position in conjunction with the provided first and second advance positions contain information on the movement of the body parts subject to vital movement and thus form an example of the movement data mentioned below. In general, the movement data can be provided, that is to say in particular determined before the method is performed. Preferably, it is determined, before the procedure positions are determined, on the basis of only the advance regions and/or advance positions. However, it is also possible (in addition or as an alternative) to determine movement data using procedure positions and/or procedure regions in accordance with other embodiments.

The determination method according to the invention has the object of processing the incoming procedure analytical image data as far as possible in real time in order to output position data that describe the change in position of body parts subject to vital movement and enable control of a treatment beam as far as possible in real time. Consequently, advantageously the object is an effective identification of the procedure regions which thus takes as little computing effort and time as possible. To make determination of the procedure regions as effective as possible, advantageously movement data that includes information on the vital movements is used. On the basis of the movement data, in particular a determination region that represents only part of the procedure analytical image and to which the procedure of determining the procedure region is restricted is determined. It is also possible for a plurality of regions to be available as candidates for determination as a procedure region, since for example they have sufficient similarity to qualify as candidate regions. In that case, according to an embodiment, those candidate regions that lie outside the determination region are eliminated, and/or an alert is output if no candidate region lies within the determination region. On the basis of the alert, it is possible in this case for example to interrupt the treatment beam and/or to output an alarm. The determination region in particular includes a smaller number of pixels than the procedure analytical image, in particular less than 50% or less than 20% or 10% of the pixels. The procedure region is in particular smaller than the determination region. This means that the determination region is preferably selected to be larger than the advance region. The determination region is in particular larger, in particular more than twice or more than four times the size of the advance region or procedure region. The advance region and the procedure region preferably include more than 500 or 1,000 or 2,000 or 5,000 or 10,000 pixels of the analytical image. Examples are as follows:
170×140=23,800 pixels
120×170=20,400 pixels
78×100=7,800 pixels
82×82=6,724 pixels According to the invention, this movement data includes in particular data indicating in which region of the advance analytical images the advance regions representing a determined body part (e.g. tumor) are anticipated. On the basis of this region, which is called the advance subimage, a procedure subimage is determined. This procedure subimage is preferably determined on the assumption that the recording conditions remain the same and the patient is at rest, such that it occupies the same segment within the procedure analytical image as the advance subimage within the advance analytical image. The procedure subimage is an example of the determination region in which determination of the procedure region is performed (automatically). The procedure subimage represents a partial image of the procedure analytical image. The movement data thus advantageously includes subimage definition data, which makes it possible to determine a procedure subimage in the procedure X-ray image that in particular represents the present condition of the anatomical body and in particular the present position of one of the body parts subject to vital movement. Preferably, advance subimages are defined for each of the advance regions of an advance analytical image, if the latter includes a plurality of advance regions. An advance subimage for an advance region is for example defined by a doctor, who views a sequence of advance analytical images before treatment with a treatment beam in order to establish in which region a determined one of the advance regions (e.g. the first advance region) is to be found in each of the advance analytical images.

Preferably, it is taken as a starting point here that the recording conditions for the analytical images (advance analytical images and procedure analytical images) are the same and remain the same, with the anatomical body in particular being at rest other than for vital movements, such that its position in relation to the analysis device does not change. The analytical images thus preferably each show the same segment of the anatomical body, provided this segment is unaffected by vital movements. On viewing a sequence of advance analytical images or procedure analytical images, it thus appears to the observer that an advance region and/or procedure region within the sequence move because of the vital movements, whereas body parts not subject to vital movement appear to be static. This "movement" of the regions within the sequence follows a determined path of movement which, as explained below, can also be used to facilitate determination of a procedure region.

If a plurality of procedure regions are determined, then there is associated with at least one and preferably each of the procedure regions a procedure subimage within which the respective procedure region is to be determined. The determination procedure is thus preferably restricted to the procedure subimage in order to reduce data processing effort.

The above-mentioned movement data may thus also include so-called sequence data. The sequence data describes the positions of a determined advance region that occupies the latter in different advance analytical images and thus describes the above-mentioned path of movement or sequence of positions. The sequence data thus enables a partial region of each procedure analytical image in which the said movement path lies to be determined. Thus, if a search is made in the partial region for the procedure region corresponding to the advance region that passes through the path of movement, it is possible to determine the procedure region in each of the procedure analytical images with a high degree of reliability. The partial region thus forms a further example of a determination region that is determined on the basis of the movement data.

The sequence data may also be used for even more concrete establishment of a determination region if the sequence data that describes the sequence of positions of the advance regions is supplemented by the position of the last-determined procedure region. On the assumption that the procedure regions pass through a path of movement that is the same as the path of movement described by the sequence, which is probable because the vital movements have remained the same, it is possible to estimate approximately where the procedure position of the present procedure region should lie, on the basis of the position of the previous procedure region and the sequence of advance positions that are described by the sequence data. If in particular the advance analytical images were recorded at the same (constant) frequency at which the procedure analytical image is at present being recorded, then it is possible, on the basis of the sequence of advance positions and the last procedure position, to determine the current procedure position on a determination region. The last procedure position lies at an advance position or between two advance positions in the sequence, or in other words it lies at a point on the path of movement described by the sequence. Since the frequency of the analytical image recordings is known, it is possible to associate with each point or portion on the path of movement a speed at which the movement takes place along the path of movement. Thus, if the last procedure position and the frequency are known, the current procedure position can be predicted. The thus predicted procedure position can then be used as the basis for determining the position of the determination region. In particular, the position of the determination region can be selected such that it is at least approximately the same as the predicted procedure position. If for example the last-determined procedure region lay between the first and second advance positions in the sequence, then preferably the position of the determination region for the present procedure region will be established between the second and third advance positions, with the first, second and third advance positions in this case designating the position of an advance region at successive first, second and third points in time when the analytical images are generated. If, however, for example the last-determined procedure region lay at the first advance position of the sequence of advance positions, then the determination region for the present procedure region will preferably be set around the next, that is the second, advance position of the sequence of advance positions.

The above-mentioned steps of establishing the determination region on the basis of the sequence data will be all the more successful, the more constant the "amplitude" and frequency of the repetitive vital movement, which is similar to an oscillation. The "amplitude" corresponds to the distance from the center of the path of movement to the two ends of the path of movement. Assuming a constant amplitude, the determination region may be selected such that it covers the path of movement.

So that the determination region may be selected to be as small and flexible as possible, the path of movement that is described by the advance positions is preferably correlated with data of vital functions that characterizes the vital functions, that is to say in particular vital parameters that describe the pulse or respiration, in particular the amplitude and/or frequency, that is to say in particular the amplitude of the respective vital parameter as a function of time. In other words, in this way the point on the oscillation-like path of movement at which the procedure region is at present located can be ideally determined. Preferably, the influence of pulse and respiration on the movement is analyzed such that the influence thereof can be described in a way uncoupled from vital movement. Preferably, data of vital functions that enables the position of the procedure region to be predicted on the basis of a correlation between the sequence data and the data of vital functions is thus provided. The description of the movement of the procedure positions along the path of movement may for example utilize a model that describes the vital movement resulting from respiration and the vital movement resulting from pulse as coupled oscillations.

Preferably, the model uncouples the influence of pulse and respiration on vital movement. In particular, particular directions of movement are assumed for different vital movements. Preferably, for example, a downward/upward direction is assumed for respiration, whereas a medial/lateral direction of movement is assumed for the influence of the heart. It is then possible, for example using functions that are suited to describing cyclic procedures (such as sine or cosine), to describe the vital movement in the downward/upward direction that is caused by respiration, while the movement in the lateral/medial direction caused by activity of the heart is also described by a function of this kind. It goes without saying that different maximum amplitudes may be associated with the two functions and these may then be combined.

Correlating the data of vital functions with the sequence data thus enables an anticipated position of the present procedure region to be determined or predicted with a high degree of accuracy. The position of the determination region is then preferably selected in accordance with the predicted position. This makes it possible to keep the determination region small and hence increase the processing speed on performing the method. In particular, in this way it is also possible to predict and output position data (for controlling the treatment beam) over the time from generation of the present analytical image to generation of the next analytical image.

The predicted determination region may be used on the one hand to perform a search for the procedure region only within this determination region, on the basis of a comparison with the advance region. It is also possible to use the determination region to eliminate candidates for the present procedure region that lie outside the determination region. More than one candidate may be produced for example if a plurality of regions in the procedure image have a similarity to the advance region that exceeds a predetermined extent of similarity.

The history of movement of the procedure regions and/or advance regions is preferably used to restrict the determination region, assuming a constant and in particular directed movement of the regions within the sequence of procedure analytical images. Here, the future position is extrapolated in particular from the history of movement.

According to a further embodiment, a plurality of procedure regions based on a plurality of advance regions is determined in one procedure analytical image. For each of these determined procedure regions, a history of movement is preferably stored so that a direction of movement can be determined for each of the regions. Since all the regions are moved by the same vital functions, the same direction of movement is expected for all procedure regions. Based on this expectation, procedure regions of this kind that display a deviation from the expected direction of movement are eliminated from determining the position data. The expected direction of movement is in particular established by the majority of determined directions of movement.

Advantageously, "moving regions" of the analytical image are highlighted on a screen for determining the advance regions. "Moving regions" are regions that change their position in the analytical image from one analytical image to the next. For this purpose, algorithms that highlight a change in the image content are in particular used. For this purpose, the technique of background subtraction—that is a difference formation between a current image and an average image—may for example be used.

The average image is for example the average of a sequence of analytical images that has already been obtained. This average is in particular calculated for each pixel coordinate. Consequently, parts in the image that are not moved by background subtraction are suppressed.

Thus, the moving region is retained in the image indicating difference and is thus easier for an algorithm or the doctor to detect. As an alternative to this, or in addition hereto, filtering methods may be used, such as a high-pass filter that only allows through or highlights in the sequence of advance analytical images those regions that change. In particular, regions in which changes take place may be highlighted in the image so that the identification of suitable advance regions is made easier for the doctor.

As mentioned, a plurality of analytical images (advance analytical images and/or procedure analytical images) may in particular be obtained at the same time with different imaging geometries, that is in particular may be obtained from different recording directions, and corresponding analytical image data be made available for the method. Thus, at the same time, in particular synchronously, the same body parts subject to vital movement are represented in different analytical images (advance analytical images and/or procedure analytical images). This may be used as additional information to determine a procedure region with a higher degree of reliability and/or to check the determination of a procedure region that is based on an imaging geometry (recording direction) by means of a procedure analytical image based on a different imaging geometry (recording direction). For this purpose, the principles of epipolar geometry may be used. In this regard, reference is once again made to the cited documents already given herein. In particular, it is possible here to utilize the fact that some body parts subject to vital movement are easier to detect in one of the analytical images than in another. For example, the body parts subject to vital movement may be concealed by other body parts in one of the images but detectable in the other. By combining analytical images that have been obtained from different directions but at the same time, it is thus possible to determine a procedure region with a high degree of reliability and thus in particular to make the method more robust.

This above-mentioned principle of using additional information from further analytical images obtained at the same time may be used in any type of determination method, in particular when no movement data is used and/or no information is used on the relative positions of the first and second body parts subject to vital movement. The above-mentioned principle, in particular the use of epipolar geometry, may thus be used regardless of how the procedure region is determined.

In other words, the above-mentioned principle may be used even with a determination method that does not use features a and b of claim 1. In particular, according to a variant on the invention, the following is included:

A determination method for making it possible to determine the position of a body part subject to vital movement that is to be irradiated, by means of determining a region (40) of an analytical image, wherein the region represents a body part (10') subject to vital movement, in particular a tumor in an anatomical body, and performs a change in position from one analytical image to the next that reflects the vital movement, wherein the body parts subject to vital movement are parts of the body that are to be irradiated or are not to be irradiated and that move as a result of vital functions such as respiration and/or heartbeat even when the anatomical body is otherwise kept deliberately at rest, advance analytical image data, which includes the description of an advance analytical image having an advance region in which a first body part subject to vital movement is represented, is provided, procedure analytical image data that includes the description of a procedure analytical image of the body structure is provided, on the basis of the advance analytical image data and the procedure analytical image data, a procedure region, which corresponds to the advance region and occupies a procedure position in the procedure analytical image, is determined in the procedure analytical image, wherein the procedure analytical image data includes the description of two procedure analytical images that were obtained at the same time but from different recording directions, and wherein the procedure position, which was obtained on the basis of one of the two procedure analytical images, is used to determine the procedure region in the other of the two procedure analytical images on the basis of the imaging data, which includes at least information on the different recording directions, and/or to check the determination of the procedure region in the other of the two procedure analytical images. Preferably, the last-mentioned step of determining and/or checking includes the following: preferably, on the basis of the imaging data and the procedure region in the one of the two procedure analytical images, an epipolar line, in particular a rectilinear epipolar line, is determined in the other of the two procedure analytical images in order on this basis then to determine the procedure region in the other of the two procedure analytical images or to check the determination of the procedure region in the other of the two procedure analytical images.

The imaging data preferably includes information on the imaging geometry. The information on the imaging geometry in particular includes information on the imaging direction. The information on the imaging geometry preferably includes information that enables the analytical image to be determined when the relative position of the analysis device in relation to the analysis object that is to be analyzed by the analytical beams and/or waves (in the present case the patient or a calibration model) is known, where the object to be analyzed is known. Here, "known" means that the spatial form of the analysis object is known. This means that three-dimensional "spatially resolved" information on the interaction of the analysis object with the analytical beams and/or waves is known. Here, "interaction" means that for example the analytical waves and/or beams are blocked by the analysis object or are partially or entirely allowed to pass through. Information on this interaction is preferably three-dimensional, for example being known from a three-dimensional CT, and describes the interaction with spatial resolution for (in particular, all of the) points and/or regions of the analysis object. In particular, knowledge of the imaging geometry enables the position of a source of the beams (e.g. in the case of an X-ray source) in relation to an image plane to be calculated. Regarding the relationship between three-dimensional analysis objects and two-dimensional analytical images, which is defined by the imaging geometry, reference is in particular made to the following publications:

1. "An Efficient and Accurate Camera Calibration Technique for 3D Machine Vision", Roger Y. Tsai, Proceedings of IEEE Conference on Computer Vision and Pattern Recognition, Miami Beach, Fla., 1986, pages 364-374
2. "A versatile Camera Calibration Technique for High-Accuracy 3D Machine Vision Metrology Using Off-the-Shelf TV Cameras and Lenses", Roger Y. Tsai, IEEE Journal of Robotics and Automation, Vol RA-3, No 4, August 1987, pages 323-344. See also http://www.cs.cmu.edu/~rgw/TsaiDesc.html
3. Publication by Ziz Yaniv, "Fluoroscopic X-ray Image Processing and Registration for Computer-Aided Orthopedic Surgery"
4. EP 08 156 293.6
5. U.S. 61/054,187

As an alternative or in addition to the embodiment above, in an embodiment procedure analytical images that have been processed in the manner above are used to determine the procedure regions. In particular, an image indicating the differences between the present procedure analytical image and the preceding procedure analytical image is formed in order to detect regions in which a change took place, which therefore enable movement to be inferred. The data representing the difference image also forms an example of movement data. The determination region is preferably established such that it includes these regions of change. Other techniques for highlighting changes, such as the above-mentioned high pass filter, may also be used in a manner similar to the difference image.

If a range of advance regions is provided for the method according to the invention, for example by a selection made by a doctor, then it is possible to select automatically from these provided advance regions one or more advance regions that form the basis for determining the procedure region. The selection may be made in particular on the basis that the density of information in the advance region to be selected is greater than in other advance regions. This increases the probability that a corresponding procedure region will be detected correctly. For example, for this purpose the image energy in the respective advance region, or the average contrast, or the compressibility of the respective advance region may be determined. The advance region or regions with the highest image energy, highest contrast or lowest compressibility are then preferably selected. If for example a predetermined compression method is applied to all the advance regions, then preferably the advance region (or regions) having the greatest data content after loss-free compression will be selected. Here, it is assumed that such regions can be detected in the procedure analytical image with a relatively high degree of reliability.

Herein, various methods of establishing a determination region are described, for example by determining a subimage, a partial region or a region of change. At least two of these methods may be combined, for example such that ultimately the determination region is established as the average quantity or the combined quantity of determination regions that are determined by the different methods.

Where data, regions, ranges or images are "provided" herein, this means that they are made available for use by the method according to the invention. This condition of "being made available" may be achieved by the data, regions, ranges or images for example by detection of the data, regions, ranges or images (for example by analysis devices) or by inputting the data, regions, ranges or images (for example via interfaces). The data may also attain this condition by being stored in a memory (e.g. ROM, CD, hard disk) and thus being made available for use in the context of the method according to the invention.

Once a determination region has been (finally) established, for example by establishing the above-mentioned subimage and/or the above-mentioned partial region, then preferably within this determination region the values are spread—that is, the grayscale values represented by the pixel data are spread—over the entire possible gray scale. This artificially raises the dynamic content of the determination region in order to increase the probability of detection.

According to a further embodiment, the contour of the tumor is used in identifying the procedure regions, and/or a change in the contour of the tumor is determined by automatic image processing of the procedure region representing the tumor, and is output as additional output data (contour data) by the determination method. Using the contour data that describes the current contour of the tumor, which may change from one procedure analytical image to the next, the treatment beam may be adapted to the current shape of the tumor such that as far as possible the beam only passes through the surface of the tumor that is predetermined by the contour—that is, it has a surface area corresponding to the contour. This may also be achieved for example in that it scans the tumor, taking account of its shape, if the treatment beam is smaller in diameter than the tumor. In particular, it is possible to control devices that enable the cross-sectional shape of the treatment beam to be adapted to the current contour of the tumor. In this regard, reference is made by way of example to the following patent applications:

U.S. Pat. No. 7,386,099
U.S. Pat. No. 5,889,834

The contour of a tumor may for example be established advance by a doctor with the aid of the advance analytical images. According to the invention, the current contour may in particular be determined automatically, for example by applying an edge detection method to determine the edge of the tumor in the procedure region representing the tumor. It is also possible, in addition or as an alternative, to use the shape and/or contour of the tumor that was determined advance in order, applying similarity rules and/or assuming elastic deformation, to adapt the contour and/or shape that was established advance to the image data of the procedure region, this data in particular having undergone the above-mentioned edge detection method in order in this way to determine the current contour and/or shape and hence the so-called contour data. Concepts that are applied here are:
Deformable models, active contours and snakes.
An overview of these is found in the publication:
"Deformable Models in Medical Image Analysis: A Survey" by Tim McInerny and Demetri Terzopoulos, Oxford University Press; Medical Image Analysis (1996), volume 1, number 2, pp 91-108.

As mentioned above, the method according to the invention preferably outputs position data that enables the position of the treatment beam to be controlled. According to an embodiment, in addition it is also possible to output the contour data, which in particular describes the contour, a change in shape and/or the shape of the tumor, in order on this basis to control the treatment beam and in particular the shape of the cross section of the treatment beam.

In a further embodiment of the method according to the invention, this includes determining the control data. Preferably, the control data is determined on the basis of the position data, that is to say the determined procedure positions of the procedure regions. The current control data is here preferably determined on the basis of the presently determined (that is, currently determined) procedure position. Furthermore, preferably information that describes the relative position of the treatment beam in relation to the anatomical body and the relative position of the analytical beam imaging geometry in relation to the treatment beam is used. The information that is preferably provided on the analytical beam imaging geometry in particular enables the direction of the analytical beams in particular in relation to the anatomical body to be determined, wherein the analytical beams are used to generate the analytical images. Information on the anatomical body is for example generated on the basis of three-dimensional analytical methods that are performed advance, such as three-dimensional computer tomography and/or magnetic resonance analysis. In particular, it is also possible to detect marker devices that are attached to the anatomical body and are fixedly connected for example with body parts at rest and/or subject to vital movement. In particular and preferably, information is provided on the relative position of these marker devices in relation to the body parts represented in the three-dimensional analytical image, in particular body parts at rest and/or subject to vital movement, such as the tumor, this information being an example of data of vital functions.

According to an embodiment, analytical images are generated by more than one analysis device, wherein each analysis device has a different analytical beam imaging geometry. According to this embodiment, the analytical images that are generated by different analysis devices are processed separately. According to an embodiment, alerts are output if the position data points that are based on the different analytical images (generated by the different analysis devices with different analytical beam imaging geometries) in parallel (by the determination method according to the invention) contradict one another. According to an embodiment, if only one of the determination methods performed in parallel gives a result, then this result is used. Preferably, an alert is output in this case too.

According to an embodiment, before treatment begins the reliability of the determination method according to the invention is tested in that a sequence of procedure regions is determined by the determination method according to the invention and this sequence of procedure regions is displayed on a screen. The doctor can thus check whether the automatic determination of the procedure regions that is performed according to the invention accords with his or her expectations. In this case, determining the procedure regions is performed in the context of planning treatment using the treatment beam.

The invention further relates to a program that on running on a computer or being loaded onto a computer causes the computer to perform the method according to the invention. The invention further relates to a computer having a program of this kind. The computer in particular includes interfaces for inputting the data required to run the program, such as the advance analytical image data and the procedure analytical image data. Further, the movement data and/or sequence data and/or correlation data is preferably input, and is processed according to the invention.

The invention further relates to a memory for storing the program, such as a CD, DVD, ROM, and so on, on which the program is stored. The invention also relates to a signal wave which carries information that represents the program.

Within the context of the invention, computer program elements may also be embodied by hardware and/or software (this also includes firmware, software that is stored in the system, microcode, and so on). Within the context of the invention, computer program elements may take the form of a computer program product that may be embodied by a storage medium which may be used on a computer or is computer-readable and includes program instructions, "code" or a "computer program" that may be used on a computer or is computer-readable, and which is embodied on the said medium for use on or in connection with the system performing the instruction. In the context of this invention, a medium that may be used on a computer or is computer-readable may be any medium that may contain, store, transfer, propagate or transport the program—that is, the program for use on or in connection with the system, equipment or device that performs the instruction. The medium that may be used on a computer or is computer-readable may be for example an electronic, magnetic, optical, electromagnetic, infrared or semiconductor system, equipment of this kind or a device of this kind or a propagation medium such as the internet, but is not restricted to the items listed. The medium that may be used on a computer or is computer-readable could even be paper or another suitable medium on which the program is printed, since the program could be detected electronically by for example optically scanning the paper or another suitable medium and then compiled, interpreted or processed in another suitable way. In the exemplary embodiments, the computer program product and any software and/or hardware that is described here form the various means for performing the functions of the invention.

Further, the invention relates to a treatment beam system that in particular includes the above-mentioned computer. Further, the treatment beam system preferably includes a treatment device for generating and emitting the treatment beam. This treatment device is preferably coupled to the computer, wherein the computer outputs control signals that are processed by the treatment device such that the position of the treatment beam is changed on the basis of the control signals. Further, the treatment beam system preferably includes at least one analysis device for generating the advance analytical images and the procedure analytical images. The analysis image data that represents the analytical images is preferably fed by the analysis device (for example via an interface) to the computer, which then processes this data in accordance with the program according to the invention. Further, the treatment system preferably includes a user interface, such as a screen, keyboard and/or mouse, which enable a user to determine advance regions and/or to input movement data, wherein the computer is in particular constructed such that the advance analytical images are for this purpose displayed on the screen. The treatment beam system according to the invention may, according to an embodiment, further include a detection device for detecting the above-mentioned marker device. This detection device is advantageously part of an integrated navigation device which operates in accordance with the principles of image-guided surgery (IGS) and in particular correlates analytical data that is input into the computer with the position of the detected markers. Advantageously, according to a further embodiment, the treatment beam system includes an interface for inputting data of vital functions that relates in particular to respiration and/or pulse.

The treatment beam system may further include a meter for the data of vital functions, in order to measure the data of vital functions.

PREFERRED EMBODIMENTS OF THE INVENTION

Figure 1:
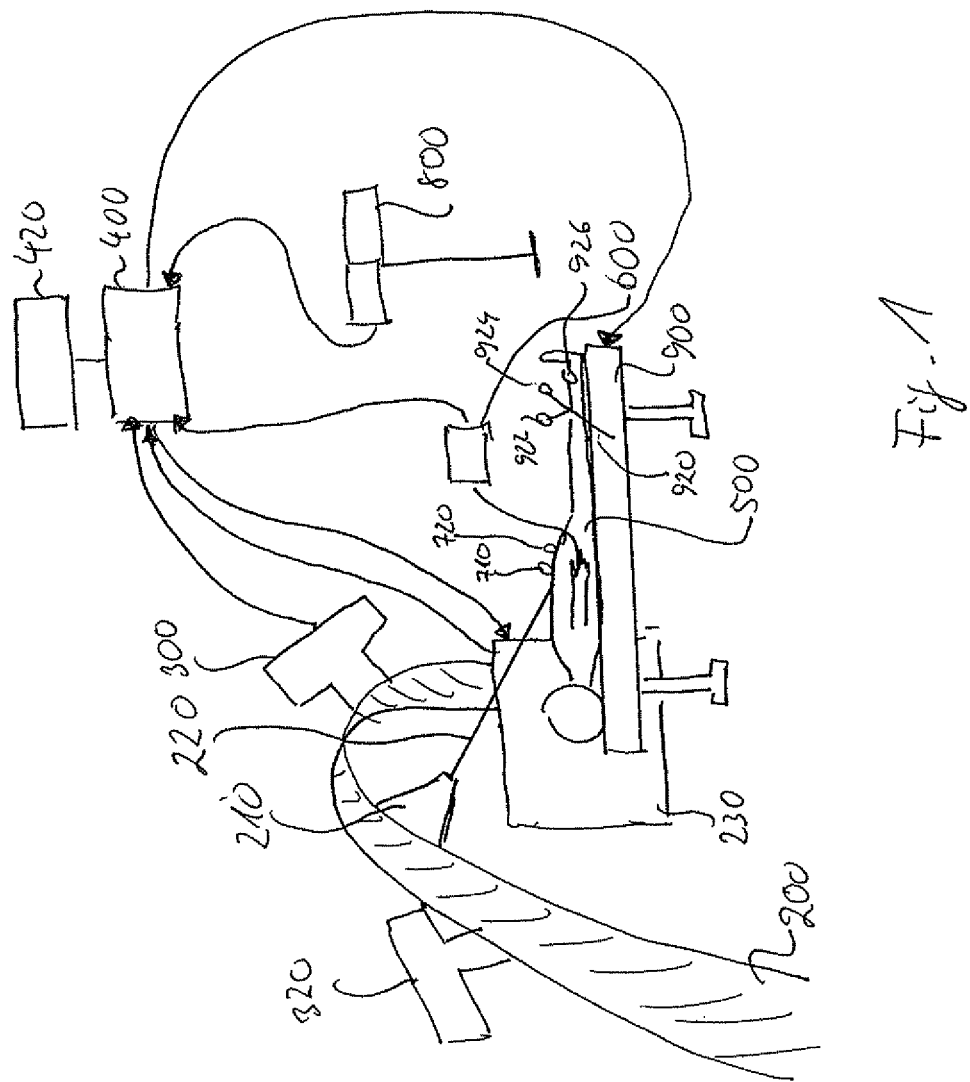
FIG. 1 shows a treatment beam system according to the invention.

FIG. 1 shows a treatment beam system according to the invention. This includes a treatment device 200 having a treatment beam emission part 210 that emits a treatment beam 220. Furthermore attached to the treatment device 200, in a fixed spatial relationship therewith, is an X-ray machine 300, which represents an example of an analysis device. The X-ray machine 300 is connected to a PC 400, which has a monitor 420, in order to receive X-ray image data, which represents an example of analytical image data. As the user interface there serve for example a mouse 411 and a keyboard 410. From the computer 400, control signals furthermore go to the control device 230 of the treatment device in order to control the position of the treatment beam 220 in relation to the patient 500. The patient 500 is monitored by medical monitoring equipment such as a pulse oximeter 600, which emits pulse signals to the computer 400. Further, for example the respiratory movement of the patient 500 is monitored by detecting markers 710 and 720 that are secured to the patient for example in the region of the abdomen. The markers 710 and 720 are detected by a detection device 800, which emits the detection signals to the computer 400 such that the latter can calculate the position of the markers 710 and 720 and in particular the change in position. The patient lies on a table 900 that is preferably movable in relation to the treatment device. The table 900 further preferably has a marker device, in particular a reference star 920 whereof markers 922, 924 and 926 may also be detected by the detection device 800. The detection signals that are generated in this way are fed to the computer 400. The computer 400 then calculates the position of the reference star 920. The relative position of the reference star 920 in relation to the markers 710 and 720 contains information on the vital movements and can be used as data of vital functions. The patient is mounted in a fixed position in relation to the lying surface 900. Three-dimensional CT X-ray images that have been obtained advance may be recorded in accordance with the principles of image-guided surgery as X-ray images that were obtained by the X-ray machine 300, preferably by at least one further X-ray machine 320, in a reference system of a navigation system that is formed by the detection device 800 and the computer 400.

The term marker device may be understood as an individual marker or indeed a plurality of markers. The function of a marker is to be detected by a marker detection device (e.g. a camera) such that its position (that is its location and/or alignment) in space can be determined. Such markers may be active markers. An active marker emits for example electromagnetic radiation or waves, wherein this radiation may lie in the infrared, visible and/or ultraviolet spectral range. It is also possible for the marker to be passive, however, that is to say to reflect for example electromagnetic radiation from the infrared, visible and/or ultraviolet spectral range. For this purpose, the marker may be provided with a surface that has appropriate reflective properties. It is also possible for a marker to reflect and/or emit electromagnetic radiation or waves which lie in the range of radiofrequencies or at ultrasound wavelengths. Preferably, a marker has a spherical or ball-like shape and so can be designated a marker ball.

The term reference star designates a device on which a plurality of marker devices, advantageously three, are mounted. The marker devices are in this case mounted on the reference star in a fixed position and advantageously detachably, such that a known relative position between the marker devices is produced. The reference star serves to mount a plurality of marker devices on an object (such as a bone or a medical instrument) during a surgical navigational procedure in order to be able to detect the position of the object in space (that is, its location and/or alignment). A reference star of this kind usually includes a means of mounting on the object (such as a band clamp and/or a screw thread), a holding element that ensures clearance between the marker devices and the object (in particular in order to aid visibility of the marker devices for a marker detection device) and marker holders, which are mechanically connected to the holding element and on which the marker devices may be mounted. Where this is clear from the context, the term reference star may also designate a reference star having at least one marker device mounted thereon. A system of this kind, comprising a reference star and at least one marker device, may also be called a marker star.

In the method according to the invention, the computer 400 determines the procedure position of a tumor that is to be irradiated, on the basis of the X-ray image data of the X-ray machine 300 (or in addition also the X-ray machine 320). Further, data on the relative position between the X-ray machines 300 and 320 and the treatment beam part 210 is fed to the computer 400 from the control device 230, such that this treatment beam part 210 can determine, on the basis of the determined procedure position, control signals that control the control device 230 such that the treatment beam 220 passes through the tumor. A device that emits the treatment beam may for example have, for the purpose of controlling the direction of the beam, a cardan joint and/or a robot arm that is controlled by the control signals.

Moreover, the table 900 may be constructed to be movable in order to shift the patient into a suitable position for the irradiation. For this purpose, once more control signals are emitted by the computer 400 to the table 900. The position of the table may be established by way of the reference star 920. In particular, data that describes the relative position between the reference star 920 and the patent at rest is provided for the computer such that it is possible to determine which region of the patient's body 500 is to be irradiated by the treatment beam 220. This may in particular be supplemented by determining the position of a three-dimensional X-ray image in order in this way to align the treatment beam to the tumor. Deviations from this alignment may then be detected by the X-ray machines 300 and 320, which preferably record images at a frequency in the region of a second. From the known position of the patient in relation to the imaging geometry of the X-ray machine, it is possible to determine which body region is being detected by the X-ray machines 300 and 320. The fact that the markers 710 and 720 are detected by the detection device 800 enables a respiratory movement to be detected, which may then also be used in determining the position of the tumor (the procedure region represented by the tumor).

Figure 2:
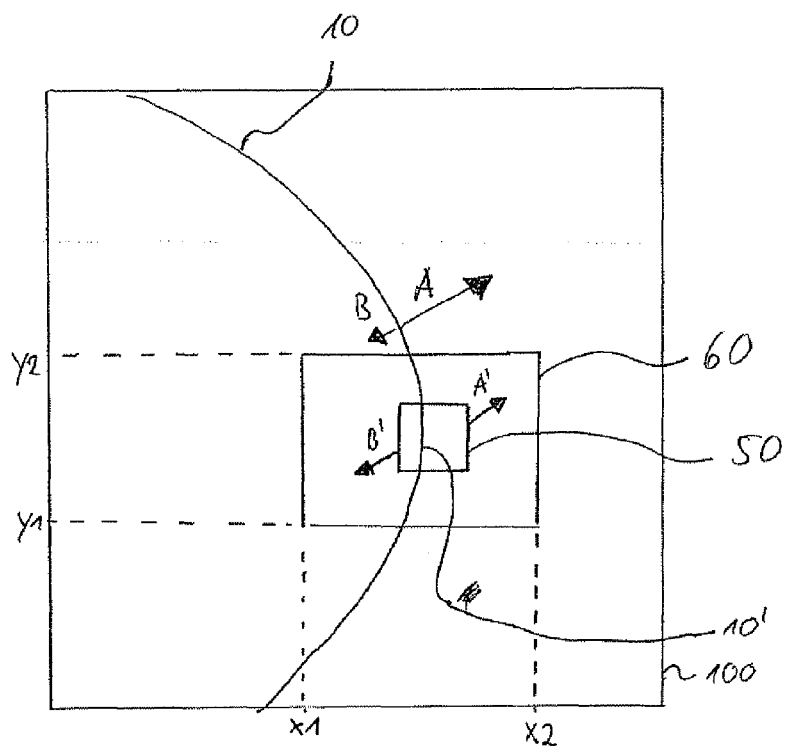
FIG. 2 shows an advance X-ray image.
Figure 3:
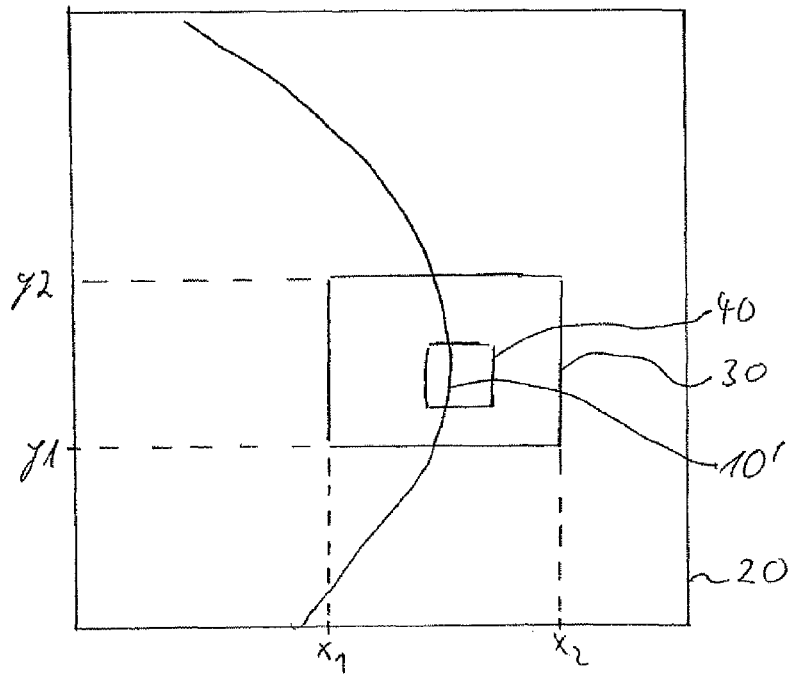
FIG. 3 shows a procedure X-ray image.

FIG. 2 shows an advance X-ray image as represented for example on the monitor 420 (see FIG. 1). The advance X-ray image 100 shows the contour of a diaphragm 10, an advance region 50 and an advance subimage 60. The advance region 50 contains as a body part a portion 10' of the body part 10. The portion 10' moves with the diaphragm 10 as a result of the patient's respiration. The portion 10' thus represents a body part subject to vital movement that is represented by the advance region 50. The diaphragm moves in the directions A and B as a result of the patient's respiration. Accordingly, the advance region 50 is displaced in the directions A' or B' for advance X-ray images that were obtained at another point in time. The arrangement of the treatment beam system according to the invention is preferably selected such that the patient lies at rest while the X-ray images are obtained, and in particular maintains his or her position while the treatment with the treatment beam is performed. The vital movements that are to be taken into account according to the invention cannot be suppressed. For example, the region occupied by the advance subimage 60 in the advance X-ray image 100 is described by the coordinates x1, x2, y1 and y2. These coordinates are for example pixel coordinates of the X-ray image. These coordinates represent an example of subimage definition data. The position and size of the advance subimage may be changed interactively by a user, for example the doctor, at the screen. In this case, the doctor preferably views a sequence of advance X-ray images in which preferably at least one complete cycle of a vital movement is shown. In this way, the advance subimage may be selected to be large enough for the body part 10' and the advance region 50 that respectively contains this to be contained in the advance subimage 60. The subimage definition data is then used to establish a determination region, as shown in FIG. 3. FIG. 3 shows a procedure X-ray image 20. The procedure subimage 30 is established by the coordinates x1, x2, y1 and y2, that is from the subimage definition data. Within the procedure subimage 30, according to the invention a search is then performed for a procedure region 40, which may occupy a different position in the procedure X-ray image than the advance region 50 in the advance X-ray image. The procedure region has a greater similarity to the advance region 50 than a predetermined threshold value of a measure of similarity, and represents the same body part 10'. As a result of the establishment of a procedure subimage 30, the determination region is smaller than the advance X-ray image 100. Thus, identifying the procedure region 40 may be considerably faster than the situation in which the entire procedure X-ray image 20 is searched for a procedure region 40 that is similar to the advance region 50 (at least to a predetermined extent).

Figure 4:
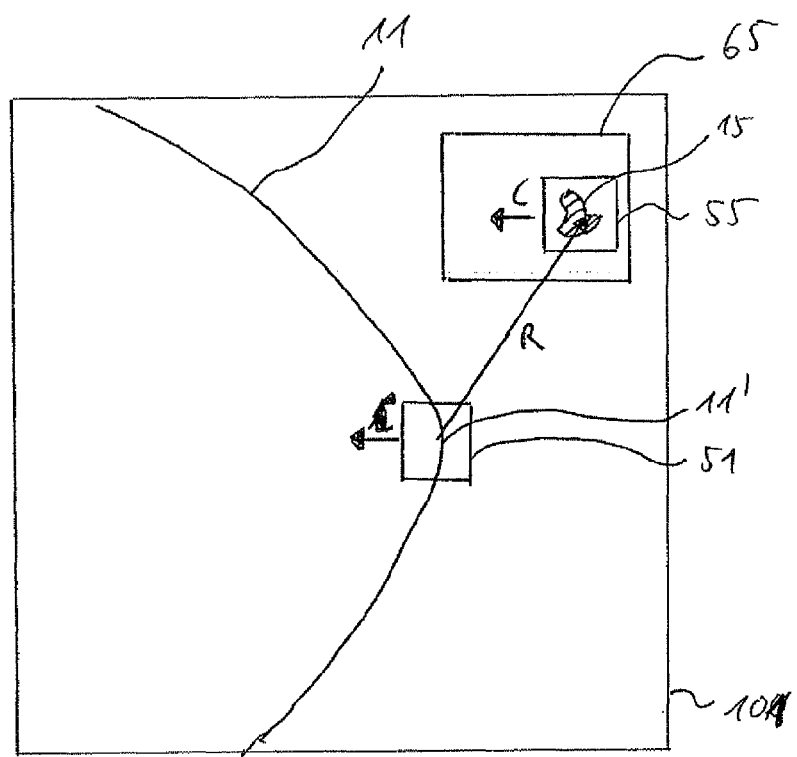
FIG. 4 shows a further advance X-ray image.
Figure 5:
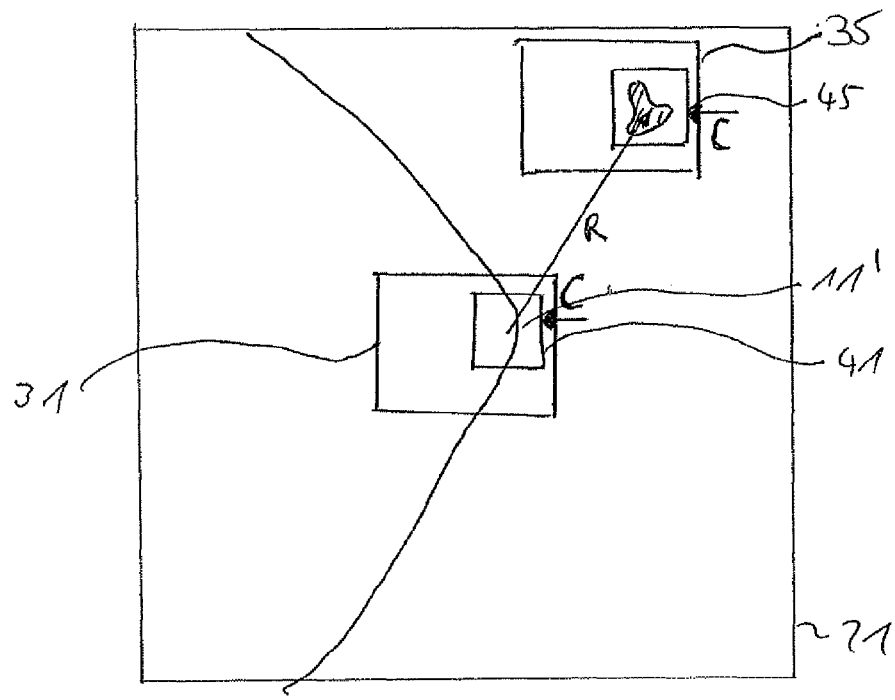
FIG. 5 shows a procedure X-ray image.

FIG. 4 shows a further advance X-ray image 101 with an advance region 51. In addition to this advance region 51 there is a further advance region 55 that represents a tumor 15. The advance region 51 represents a portion 11' of the diaphragm 11. It is assumed that the edge of the diaphragm 11, in particular of the portion 11', is detectable as high in contrast in the X-ray image 101, whereas the tumor 15 has only a low contrast by comparison with its surroundings. In other words, the portion 11' is easier to identify in the advance X-ray image 101 than the tumor 15. It is further assumed that the tumor 15 is subject to the same vital movements as the portion 11'. According to an embodiment of the invention, which may be combined with the other embodiments, there is determined in a procedure X-ray image 21 (see FIG. 5) a procedure region 41 that is similar to the advance region 51. The advance region 41 thus has for example a determined extent of similarity to the advance region 51, which exceeds a predetermined measure of similarity. Because of the higher contrast conditions, the advance region 41 can be determined with a higher degree of reliability than a procedure region 45 that corresponds to the advance region 55 and is thus similar thereto to a predetermined extent. The positions of the advance regions 51 and 55 represent, in conjunction with the determined position of the procedure region 41, movement data that makes it possible to determine the position (procedure position) of the procedure region 45. The change in position of the body part 11' from the advance X-ray image 101 to the procedure X-ray image 21 is the result of a vital movement. This vital movement corresponds to a displacement of the region that represents the body part 11 (advance region 51 and procedure region 41), which is designated by an arrow in FIGS. 4 and 5. The advance region 51 thus circumscribes a different range of coordinates in the advance X-ray image 101 than that of the procedure region 41 in the procedure X-ray image 21. This change from the advance position of the advance region 51 to the procedure position of the procedure region 41 is described by the vector C in FIGS. 4 and 5. The procedure position 45 can thus be determined from the advance position of the advance region 55 by displacing the latter by a vector C. As an alternative, the position of an advance subimage 65 may be displaced by the vector C in order in this way to determine the position of a procedure subimage 35. Within this procedure subimage 35, a search is performed for a procedure region 45 that corresponds to the advance region 55. According to a further variant, a relative vector R is determined in the advance X-ray image, which describes the relative position between the advance region 51 and the advance region 55. The procedure position of the procedure region 45 is then determined on the basis of the procedure position of the procedure region 41 by displacing the procedure position of the procedure region 41 by the vector R.

The position of the procedure subimage 35 can also be determined accordingly. For this purpose, the position of the procedure subimage 31 is for example displaced by the vector R in order to determine the position of the procedure subimage 35. Then, the procedure region 45 is determined again within this procedure subimage, using the above-mentioned method.

One advantage of the above-mentioned method is that more easily detectable regions are used to identify the position of regions that are subject to the same vital movements and are more difficult to detect. In the above-mentioned example, the advance region 51 represents a first advance region, and the advance region 55 represents a second advance region. The procedure region accordingly represents a first procedure region, and the procedure region 45 represents a second procedure region.

Figure 10:
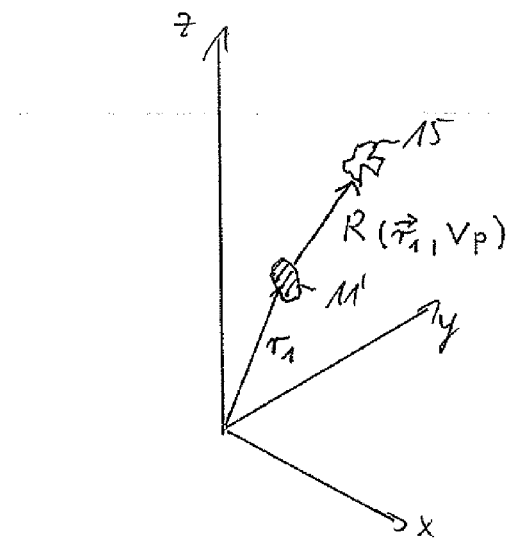
FIG. 10 shows the use of relative position data.

The above-mentioned relative vector R is an example of relative position data. In the above-mentioned example, the relative position data was described in two dimensions, that is in the X-ray image. In this case the relative position data occurs in particular in three dimensions. This three-dimensional relative position data may in particular be obtained with the aid of a four-dimensional CT, as already mentioned above. The relative position data R is in particular a function of vital parameters and/or the position of the advance region. FIG. 10 shows by way of example the position of two regions 11' and 15 in three-dimensional space. The position data of the body parts 11' and 15 may be described for example by the coordinates x, y and z that are shown. The body part subject to vital movement 11' is in a relative position that may be described by a vector R, in relation to the body part subject to vital movement 15. In accordance with the example in FIGS. 4 and 5, the body part subject to vital movement 11' should be the first body part subject to vital movement, which is easily detected in the analytical image (X-ray image). The body part subject to vital movement 15 should be difficult to detect in the X-ray image but readily detectable in the three-dimensional CT (or four-dimensional CT). The body parts subject to vital movement 11' and 15 that are shown in FIG. 10 should result from the three-dimensional or four-dimensional CT data. The vector R may be a function of $r_1$ and/or Vp. The vector $r_1$ describes the position of the body part subject to vital movement 11'. The vital parameter Vp may for example be the amplitude of respiration and/or heartbeat. With a known imaging geometry, the positions of the body parts 11' and/or the body part 15 may be re-calculated such that for example the body part 15 may be displayed in the situation shown in FIG. 4 and/or 5. Thus, it is possible to calculate the position that the body part 15 which is difficult to detect in the X-ray image would occupy in the X-ray image. In this way, the methods that are described in connection with FIGS. 4 and 5 may be applied even if the body part subject to vital movement 15 is not identifiable in the X-ray image. As an alternative, it is possible to proceed such that the vector $r_1$ is determined in three-dimensional space from the position of the body part subject to vital movement 11' in the X-ray image (see FIG. 4 or 5). This may in particular be done if two analytical images from the patient have been obtained from different directions. For this purpose, reference is once again made to the applications cited above, which enable the position in three-dimensional space to be determined from two-dimensional X-ray images with different recording directions. As an alternative, it is also possible for an operative to input the information on which position the body part subject to vital movement 11' that is shown in the X-ray image occupies in the three-dimensional analytical image that was obtained advance (three-dimensional CT or four-dimensional CT). Once the vector $r_1$ has been determined in this way, then on the basis of the three-dimensional or four-dimensional X-ray image data (analytical image data) the vector R can be determined. The accuracy of determination of the vector R can be increased by using the above-mentioned parameters $r_1$ and/or Vp, that is to say $R(r_1, Vp)$ applies. The vector R is an example of the provided relative position data.

Figure 6:
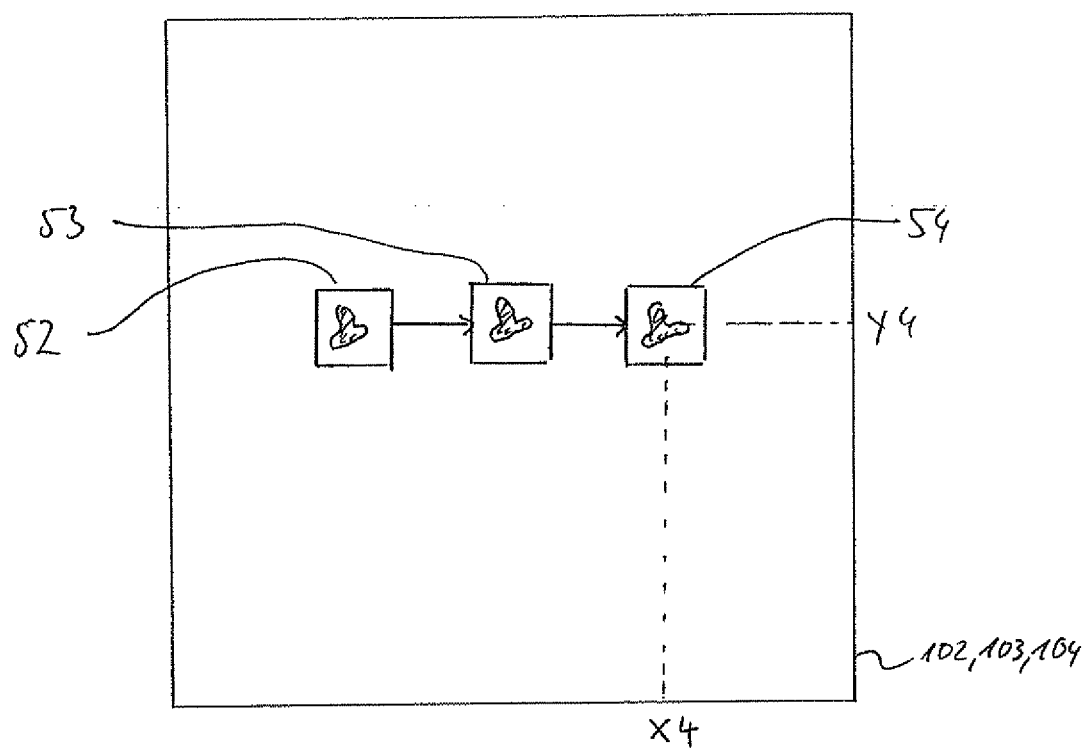
FIG. 6 shows three advance regions.
Figure 7:
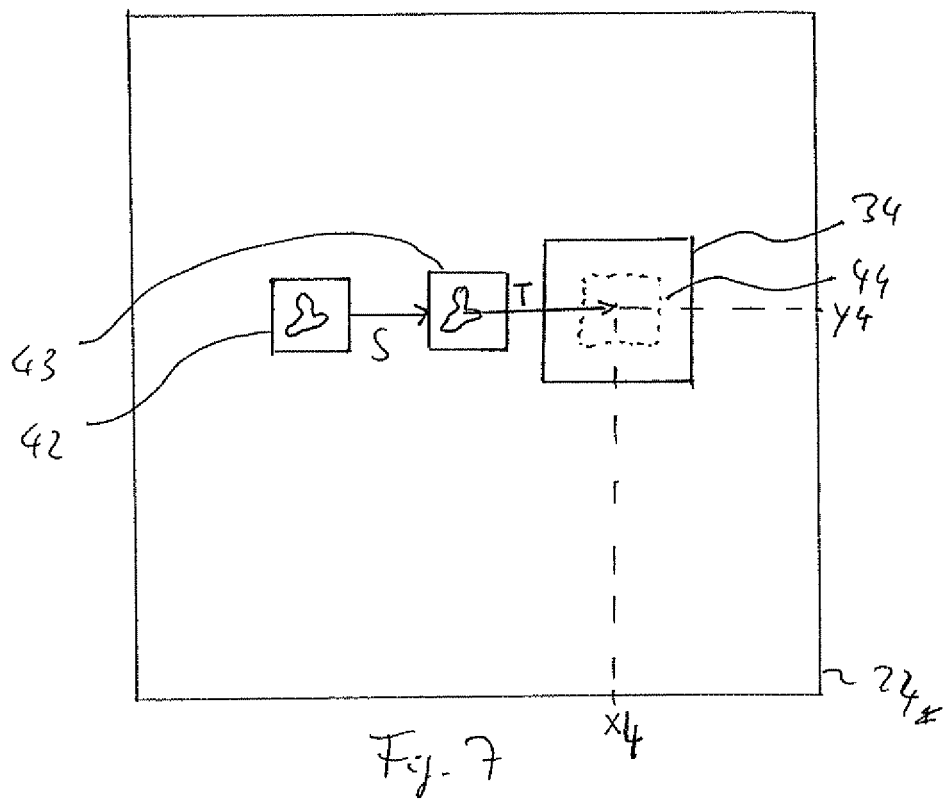
FIG. 7 shows a procedure X-ray image.

FIG. 6 shows three advance regions 52, 53 and 54, which have been determined in various X-ray images 102, 103 and 104 and each show the same body part. The three advance X-ray images 102, 103, 104 have not been shown separately but as a single image in which the advance regions 52, 53 and 54 occupy three different positions. In fact, the advance regions 52, 53 and 54 were obtained successively, however (for example at intervals of a second). The three advance regions correspond to one another and occupy three different advance positions in the three advance X-ray images 102, 103 and 104. The description of the position of the regions of the advance regions 53 and 54 (for example by the above-mentioned pixel coordinates) represent sequence data that describes a sequence of advance regions 53 and 54. The advance region 52 is part of the advance analytical image data. The position of the advance region 52, taken together with the positions of the advance regions 53 and 54, also represent sequence data. The sequence data also forms an example of the movement data that represents information on the vital movements of the body parts. This sequence data establishes a determination region for the present procedure X-ray image. FIG. 7 shows a procedure X-ray image 24 in which procedure regions 42 and 43 of earlier X-ray images 22 and 23 (which are not shown) have been included. A comparison between the advance positions, shown in FIG. 6, of the advance regions 52 and 53 with the procedure positions of the procedure regions 42 and 43 shows that these correspond to one another. It can therefore be expected that the present procedure position of a procedure region 44 which has yet to be determined (indicated in dashed lines in FIG. 7) will occupy a similar position in the procedure X-ray image 24 to the advance region 54 in the advance X-ray image 104. According to an embodiment, for this reason the determination region for determining the procedure region 44 is set such that it includes a region that corresponds to the position of the advance region 54 in the advance X-ray image 104. For example, this determination region 34 is set such that its center point has the coordinates x4 and y4. These coordinates x4 and y4 correspond to the coordinates of the center point of the advance region 54. The size of the determination region 34 may then be selected for example such that it is twice as large as the advance region 54 or the procedure region 44 that is to be established. A search is then performed within the determination region 34 for the procedure region 44, which is similar to the advance region 54 to at least a predetermined extent.

As an alternative or in addition to the above-described possibilities for determining the present procedure position or the determination region, it is also possible to proceed as follows. As shown in FIG. 7, the procedure positions of the procedure regions 42 and 43 have already been determined in the two preceding determination procedures. If it is assumed that the vital movement is constant, it can be expected that the present procedure region 44 is displaced in the direction of the vector S, starting from the position of the procedure region 43. Further, it may be assumed that the extent of the movement has remained the same, and thus that the length of the vector that describes the displacement is the same as the length of the vector S. The present procedure region is thus anticipated to be in the region 44 that is indicated in dashed lines in FIG. 7. It is then accordingly possible, just as was already described above, to select the determination region 34 such that it includes this anticipated region 44.

The above-described assumption of constant movement in order to restrict the determination region of a procedure region can also be correlated with data of vital functions. The data of vital functions describes for example the patient's pulse or respiration. For example, it describes whether the patient is currently inhaling or exhaling. So-called correlation data correlates the data of vital functions with the advance positions. If for example it is known that the advance region 42 was obtained while the patient was inhaling and that the advance region 43 was obtained while the patient continued to inhale, this constitutes correlation data. The condition "inhaling" (or, to be more precise, the amplitude of the respiration cycle) can be associated with each of the advance positions, thus giving correlation data. Finally, the patient's present respiration condition, that is the respiration condition while the present X-ray image is determined, is also known. If the inhalation procedure continues, this is an indication that the vital movement continues its direction of movement. It may thus be expected, with a high degree of reliability, that the procedure region 44 is displaced in relation to the already determined procedure region 43 in a direction that is designated by the vector S in FIG. 7. This can be utilized to establish the determination region 34. If the vital data also indicates the amplitude of respiration, then the amplitude can also be correlated with the extent of displacement. If the difference in amplitude between the times at which the procedure X-ray image 22 and 23 were obtained is the same as the difference in amplitude between obtaining the procedure X-ray image 23 and 24, it can be assumed that a vector T that describes the displacement from the center of the procedure region 43 to the center of the procedure region 44 has the same length as the vector S. If the difference in amplitude is greater by a particular factor, then it can be assumed for example that the vector T is longer than the vector S by this factor. The center point of the determination region 34 then corresponds for example to the tip of the vector T, which points in the same direction as the vector S and starts from the center point of the last-determined procedure region 43.

Figure 8:
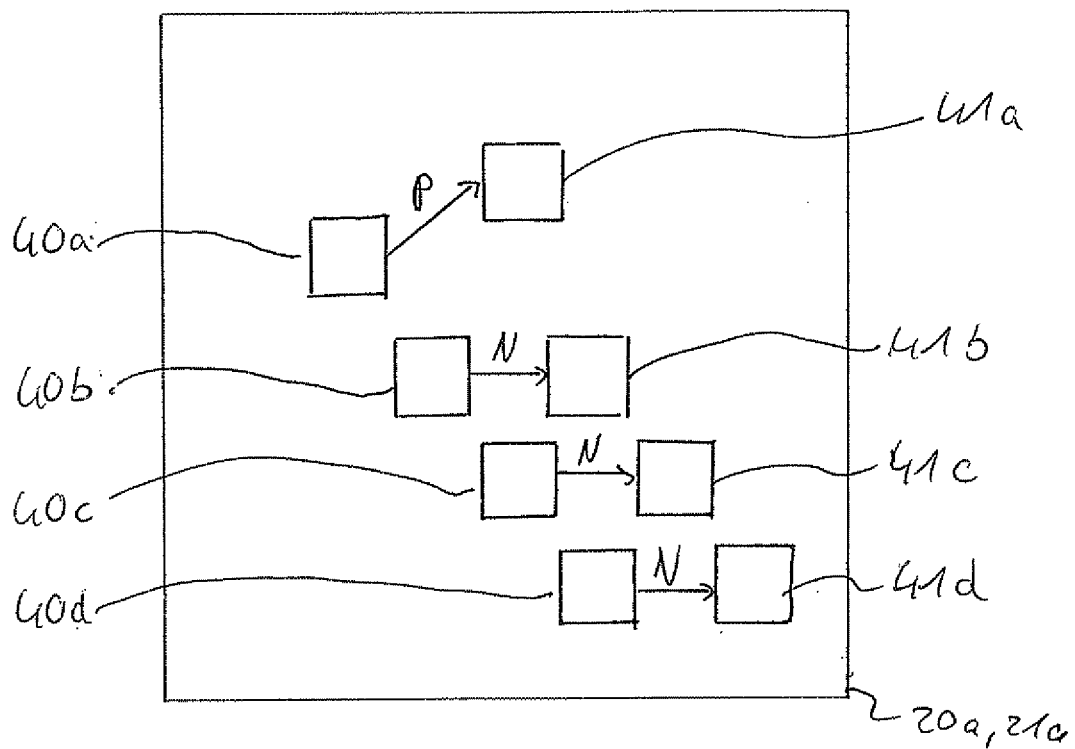
FIG. 8 shows procedure regions.

FIG. 8 shows procedure regions that have been obtained from two different procedure X-ray images 20a and 21a (in particular successively). The procedure regions 40a, 40b, 40c and 40d have been obtained on the basis of the procedure X-ray image 20a. The procedure regions 41a, 41b, 41c and 41d have been obtained on the basis of the procedure X-ray image 21a. As can be seen from FIG. 8, the procedure regions 40b, 40c and 40d undergo a change in position that is designated by the vector N in order to arrive at the procedure position of the procedure regions 41b, 41c and 41d (in the procedure X-ray image 21a). The change in position P (vector P) deviates from this. This vector P describes the change in position of the procedure position of the procedure region 40a to give the procedure position of the procedure region 41a. In the description of FIG. 8, it is assumed that the procedure region 40a represents the same body part as the procedure region 41a and is similar thereto at least to a predetermined extent. The same applies to the procedure regions 40b and 41b, to 40c and 41c, and to 40d and 41d. The change in position in accordance with the vector P deviates from the majority of changes in position, described by the vector N. According to an embodiment, the procedure regions 40a and 41a and/or the change in position in accordance with the vector P are not used to determine a change in position or in particular to determine the position of an irradiation site. Preferably, only those procedure regions and procedure positions that are not in contradiction of the majority of the changes in position (that is to say the change in position in accordance with the vector N) are used to determine the change in position that is decisive for controlling the treatment beam, or the current setpoint position of the treatment beam. This last-mentioned embodiment may also be combined with the above embodiments. In particular, the change in position N may be used for the situation shown in FIG. 4 in order to determine the current position of the tumor region 15 from the previous position of the tumor region, that is to say that the vector N corresponds to the vector C in FIG. 4.

Figure 9:
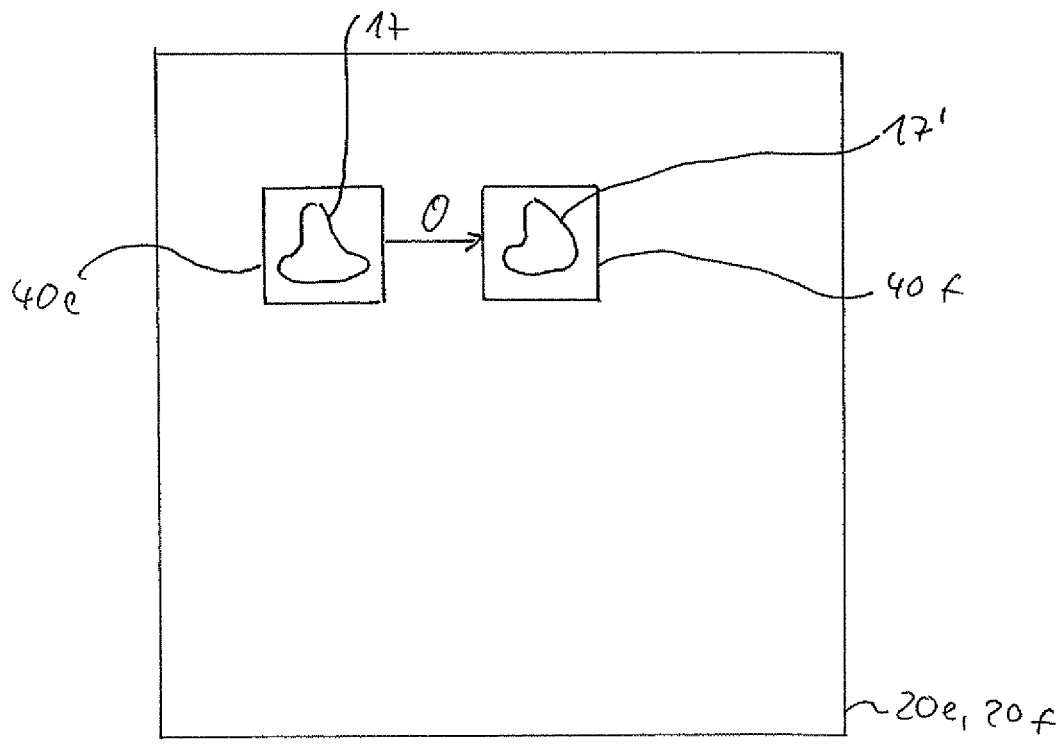
FIG. 9 shows the change in shape of a tumor.

FIG. 9 shows a situation in which a body part, in particular a tumor 17, undergoes a change in shape between the generation of an X-ray image 20e and the generation of an X-ray image 20f. Before deformation, the tumor is designated by the reference numeral 17. Thereafter, it is designated by the reference numeral 17'. The procedure region 40e represents the tumor 17 in the procedure X-ray image 20e. The procedure region 40f represents the tumor 17' in the procedure X-ray image 20f. The advance region 40f can be determined on the basis of the movement data that is used according to the invention, despite the deformation of the tumor. There is still similarity between the shapes of the tumor 17 and 17' to a certain extent. The similarity is smaller than if the tumor is not deformed. According to one of the above embodiments or a combination thereof, however, the procedure region 40f can still be determined by for example determining a displacement vector O (see FIG. 9) in the same way that for example the vector C or N was determined in the above examples. It is also possible for a determination region based on the movement data to be restricted appropriately such that the tumor 17' can still be detected.

When the similarity between 17 and 17' is determined, it is also possible to utilize the principle of elastic fusion (also called morphing) to check whether the shape of the tumor 17 can be transformed into the shape 17'. For this purpose, reference is made to the publication that was cited above.

Once the shape of the tumor 17' has been detected, it is possible, on the basis of the shape, to establish the cross section of the treatment beam and/or the volume into which the treatment beam sends its energy.

FIGS. 11a and b illustrate the utilization of the principles of epipolar geometry in the determination method according to the invention, by way of an example.

Figure 11:
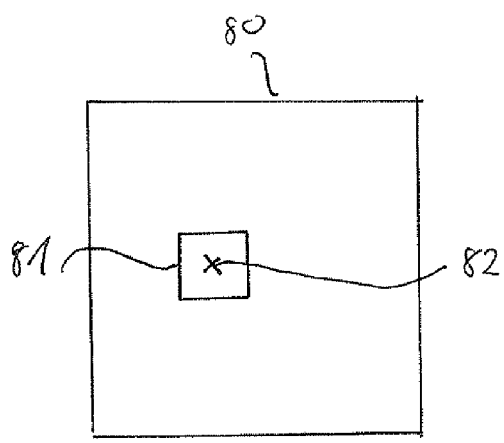
FIG. 11 shows the use of the principles of epipolar geometry.
Figure 11:
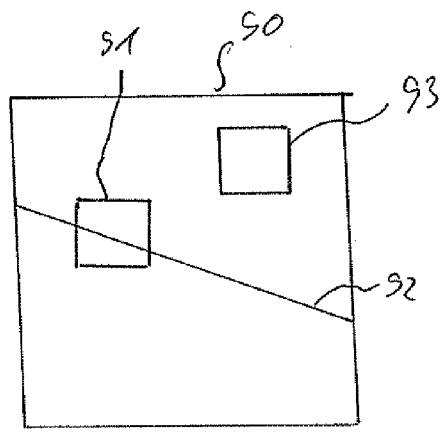

FIG. 11a is intended to be an image 80 of a sequence of procedure images that are produced from a first X-ray machine under first recording conditions, that is with a given first imaging geometry from a first recording direction. FIG. 11b is intended to be an image 90 from a second sequence of X-ray image, wherein the recordings are made from a second direction under second recording conditions, that is with a given second imaging geometry that is different from the first imaging geometry. The two sequences are synchronous in terms of time and so the recordings are in each case made at the same time. In particular, the recording of the procedure image 80 that is shown in FIG. 11a is made at the same time as the procedure image 90 that is shown in FIG. 11b. The first procedure image 80 has for example been processed according to the invention, and a procedure region 81 has been determined. The position of the procedure region 81 may for example be described by the center point 82 of the procedure region, which is marked with an "x". From knowledge of the first and second imaging geometries, it is possible to calculate an epipolar line 92 in the second procedure image 90 from the position of the center point 82. This means that, by the principles of epipolar geometry, the body part at the center point 82 must lie on the epipolar line 92 in the procedure image 90. This information can be utilized to determine the procedure region 91 in the procedure image 90. For example, a determination region may be restricted by means of the epipolar line 92. For example, the determination region is selected to be smaller than the procedure image 90 but such that it includes the epipolar line 92. In particular, the determination region is selected such that the edges of the determination region are not further away from the epipolar line than the maximum diameter of a procedure region. In particular, a search for the procedure region 91 is performed along the epipolar line. According to an alternative variant, candidates for a procedure region are determined in the procedure image 90. These candidates have for example an extent of similarity to the advance region that lies above a threshold value. The example shown in FIG. 11 has candidates 91 and 93 for a procedure region. Of these candidates, the one that includes the epipolar line 92 is then selected. Thus, inclusion of the epipolar line 92 is a criterion for selection among a plurality of candidates for a procedure region. The procedure region 91 thus corresponds with the procedure region 81. The epipolar line 92 can be obtained by projecting a ray onto the projection plane in which the procedure image 90 lies, wherein the projection is performed in accordance with the second imaging geometry. The ray that is projected is the ray from the center point 82 (marked with "x") to the source of the projection, which is performed in accordance with the specifications of the first imaging geometry. The ray thus passes from the center point 82 to the camera source, in particular the X-ray source.

According to a further variant, procedure regions of this kind which do not meet the criteria established by epipolar geometry are not used for the determination method, and in particular not for control of the treatment beam, which is based thereon. In particular, procedure regions are not used for the control if the center point of the procedure region deviates from the epipolar line by more than 10 or more than 50% of the diameter of a region.

The invention claimed is:

1. A computer implemented method for enabling a position of a body part subject to vital movement to be determined, wherein the body part changes position from one analytical image to the next reflecting the vital movement, and body parts subject to vital movement are parts of the body that are to be irradiated during treatment by a treatment beam or are not to be irradiated during the treatment by the treatment beam, by a treatment device operatively coupled with a computer, and wherein the body parts move as a result of vital functions when the anatomical body is otherwise kept deliberately at rest, the method comprising:
  obtaining, by a medical imaging device before the treatment, advance analytical image data describing a sequence of advance analytical images of body structures;
  providing the advance analytical image data to the computer;
  respectively defining, in the sequence of the advance analytical images, in accordance with a user input to the computer, an advance region in which a first body part subject to vital movement is represented, said advance region being respectively a subset of the advance analytical images;
  determining, by a detection device operatively coupled with the computer, a change of a position of marker devices;
  determining, by the computer, movement data by using the advance analytical images and the change of the position of marker devices, the movement data including information on the vital movement of body parts due to vital functions;
  obtaining, by a medical imaging device, procedure analytical image data describing procedure analytical images of the body structure, the procedure analytical image data describing a sequence of procedure analytical images that are obtained and updated during treatment;
  providing the procedure analytical image data to the computer;
  determining, by the computer, a position of a determination region that represents a portion less than an entire image of the procedure analytical image by predicting a position for a present procedure region in a present analytical image, the prediction using the movement data and a previously determined procedure position of a previous procedure region in a previous procedure analytical image, the present procedure analytical image being obtained after the previous procedure analytical image;
  automatically determining in the determination region, by the computer, based on the defined advance region, the movement data, and the determination region, the present procedure region during the treatment by searching only in the determination region for an image which corresponds to the image of the defined advance region, said present procedure region occupying a present procedure position in the present procedure analytical image;

determining, by the computer in real time subsequent to determining the movement data, said present procedure position based on said present procedure region; and providing, to the treatment device, said present procedure position based on said present procedure region.

2. The method according to claim 1, wherein determining the determination region is based on the movement data or described by the movement data, and wherein the determination of the procedure region comprises at least one of:
   a) restricting the determination of the procedure region to the determination region, or
   b) eliminating candidate regions that lie outside the determination region from being a procedure region.

3. The method according to claim 2, wherein the movement data includes subimage definition data that defines a procedure subimage as a determination region such that the procedure subimage corresponds to an advance subimage of the advance analytical image, wherein the subimage represents a region of the body in which it is assumed that the vital movement of the first body part takes place.

4. The method according to claim 2, wherein the advance analytical image includes a first and a second advance region in each of which a first body part and a second body part subject to vital movement are represented, and which are each located in a first and a second advance position, further comprising:
   determining a first procedure region in the analytical image based on the first advance region, the first procedure region corresponding to the first advance region and including a first procedure position;
   determining a relative position between at least one of the first advance position and the second advance position or the first advance position and the first procedure position based on the first advance position, the second advance position and the first procedure position; and
   determining a second procedure position of a second procedure region that corresponds to the second advance region, or the determination region for determining the second procedure region based on the movement data and on at least one of:
   the assumption that the relative position between the first and the second advance region is the same as the relative position between the first and the second procedure region,
   that the relative position between the first advance region and the first procedure region is the same as the relative position between the second advance region and the second procedure region, or
   candidate regions that lie outside the determination region are eliminated from determination as the second procedure region.

5. The method according to claim 2, wherein the movement data includes sequence data, or the movement data supplements the advance analytical image data to give sequence data that describes a sequence of advance regions reflecting the vital movement of the body part in a sequence of advance analytical images, further comprising determining the determination region based on the sequence of advance regions.

6. The method according to claim 5, further comprising determining the position predicted for the present procedure region based on the assumption that a procedure region that represents a determined body part subject to vital movement passes from one procedure analytical image to the next through a sequence of different procedure positions that correlate with the sequence of advance positions of the advance regions representing the determined body part subject to vital movement, and the previously determined procedure position, wherein determining the determination region includes determining the determination region such that the determination region includes the present procedure region if the present procedure region is at the predicted position.

7. The method according to claim 2, further comprising inputting data of vital functions that describes at least one prevailing vital parameter during generation of the procedure analytical image, wherein:
   a) based on the at least one prevailing vital parameter, determining an anticipated position of the procedure region image in the present procedure analytical image, and based on the anticipated position determining at least one of i) the determination region for determining the procedure region in the present procedure analytical image or ii) eliminating candidates for the present procedure region that are not in agreement with the anticipated result, or
   b) performing at least one or providing the relative position data as a function of at least one vital parameter or determining the procedure position and the relative position between the first and the second body part for the prevailing vital parameter or the prevailing procedure position, wherein the position of the second body part subject to vital movement is determined based on the determined relative position.

8. The method according to claim 1, further comprising determining the position predicted for the present procedure based on the previously determined procedure position and further procedure position determined before the previously determined procedure position and on the assumption of a constant movement of the body part subject to vital movement.

9. The method according to claim 1, wherein a plurality of previous procedure regions have in each case been determined in previous procedure analytical images that each represent a different one of the body parts subject to vital movement, and upon determining the present procedure regions that represent the same body parts subject to vital movement as the previous procedure regions, the present procedure regions that involve a direction of movement of the body parts subject to vital movement that deviates from that of a majority of procedure regions are eliminated from determination of the procedure positions.

10. The method according to claim 1, further comprising at least one of:
   a) using the procedure analytical image data that includes a description of two procedure analytical images obtained at the same time but from different recording directions and a procedure position obtained on the basis of one of the two procedure analytical images to determine the procedure region in the other of the two procedure analytical images on the basis of imaging data that includes at least information on the different recording directions, or to check the determination of the procedure region in the other of the two procedure analytical images, or
   b) to determine the procedure region, determining the difference between the present procedure analytical image and at least one earlier procedure analytical image, wherein the determination region is determined based on the difference.

11. The method according to claim 1, further comprising selecting among a plurality of provided advance regions, the selected advance regions forming the basis for determining the procedure regions, wherein the selection is based on image properties.

12. The method according to claim 1, further comprising:

determining control data for determining the position of the treatment beam relative to the anatomical body, wherein determining the control data is based on the determined present procedure position in relation to the known position of the anatomical body relative to the treatment beam, and in relation to the known position of the analytical beam imaging geometry relative to the treatment beam; and determining a current contour of a delimited body part subject to vital movement based on the procedure regions, wherein the control data includes contour data that describes the contour.

13. A non-transitory computer readable medium comprising a computer program which, when executed causes the computer to perform processing steps for enabling a position of a body part subject to vital movement to be determined, wherein the body part changes position from one analytical image to the next reflecting the vital movement, and body parts subject to vital movement are parts of the body that are to be irradiated or are not to be irradiated during treatment by a treatment beam, by a treatment device operatively coupled to with a computer, and wherein the body parts move as a result of vital functions when the anatomical body is otherwise kept deliberately at rest, the processing steps comprising:

obtaining, by a medical imaging device before the treatment, advance analytical image data describing a sequence of advance analytical images of body structures;

providing the advance analytical image data to the computer;

respectively defining, in the sequence of the advance analytical images, in accordance with a user input to the computer, an advance region in which a first body part subject to vital movement is represented, the advance region being respectively a subset of the advance analytical images;

determining, by a detection device operatively coupled with the computer, a change of a position of marker devices;

determining, by the computer, movement data by using the advance analytical images and the change of the position of marker devices, the movement data including information on the vital movement of body parts due to vital functions;

obtaining, by a medical imaging device, procedure analytical image data describing procedure analytical images of the body structure, the procedure analytical image data describing a sequence of procedure analytical images that are obtained and updated during treatment;

providing the procedure analytical image data to the computer;

determining, by the computer, a position of a determination region that represents a portion less than an entire image of the procedure analytical image by predicting a position for a present procedure region in a present analytical image, the prediction using the movement data and a previously determined procedure position of a previous procedure region in a previous procedure analytical image, the present procedure analytical image being obtained after the previous procedure analytical image;

automatically determining in the determination region, by the computer, based on the defined advance region, the movement data, and the determination region, the present procedure region during the treatment by searching only in the determination region for an image which corresponds to the image of the defined advance regions, said present procedure region occupying a present procedure position in the present procedure analytical image;

determining, by the computer in real time subsequent to determining the movement data, the present procedure position based on the present procedure region; and providing, to the treatment device, the present procedure position based on the present procedure region.

14. A treatment beam system, comprising:

a treatment device configured to emit a treatment beam, the treatment device including a control device for controlling a position of the treatment beam;

a data processing device comprising the non-transitory computer readable medium of claim 13.

15. The method according to claim 11, wherein the imaging properties are at least one of contrast, dynamic range, compressibility and image energy of the advance regions.

16. The method according to claim 1, further comprising determining a position of a second body part subject to vital movement based on a most-recently determined procedure position of a most-recently determined-procedure region and information on the relative position between the first and the second body part subject to vital movement, the relative position being determined based on a vital parameter.

* * * * *